US011827295B2

(12) United States Patent
Tripp et al.

(10) Patent No.: US 11,827,295 B2
(45) Date of Patent: Nov. 28, 2023

(54) UTILIZING A SUSPENSION PROTECTOR TO DEFLECT DEBRIS AWAY FROM A SET OF SUSPENSION COMPONENTS OF A TRACKED VEHICLE

(71) Applicant: Howe & Howe Inc., Waterboro, ME (US)

(72) Inventors: Forrest Joel Tripp, Saco, ME (US); Michael Howe, Biddeford, ME (US)

(73) Assignee: Howe & Howe Inc., Waterboro, ME (US)

( * ) Notice: Subject to any disclaimer, the term of this patent is extended or adjusted under 35 U.S.C. 154(b) by 304 days.

(21) Appl. No.: 17/126,554

(22) Filed: Dec. 18, 2020

(65) Prior Publication Data

US 2022/0194494 A1 Jun. 23, 2022

(51) Int. Cl.
*B62D 55/084* (2006.01)
*B62D 55/104* (2006.01)
*B62D 55/12* (2006.01)

(52) U.S. Cl.
CPC ....... *B62D 55/0845* (2013.01); *B62D 55/104* (2013.01); *B62D 55/12* (2013.01)

(58) Field of Classification Search
CPC .. B62D 55/0845; B62D 55/104; B62D 55/12; B62D 55/0882; B62D 55/084; B62D 55/08; B62D 55/00; B62D 55/088
See application file for complete search history.

(56) References Cited

U.S. PATENT DOCUMENTS

| 4,531,787 | A | | 7/1985 | Hart et al. |
| 4,830,439 | A | * | 5/1989 | Collins ............... B62D 55/088 305/110 |
| 4,840,437 | A | | 6/1989 | Henry et al. |
| 5,383,680 | A | | 1/1995 | Bock et al. |
| 5,697,683 | A | | 12/1997 | Arulandu et al. |
| 5,725,292 | A | | 3/1998 | Keedy et al. |
| 5,951,124 | A | | 9/1999 | Hoffart |
| 6,373,558 | B1 | | 4/2002 | Hasson |

(Continued)

FOREIGN PATENT DOCUMENTS

| EP | 1765660 | 3/2007 |
| EP | 1786662 | 5/2007 |

(Continued)

OTHER PUBLICATIONS

International Search Report and Written Opinion for PCT application No. PCT/US2021/063531, dated Mar. 17, 2022, 15 pages.

*Primary Examiner* — Jacob D Knutson
*Assistant Examiner* — Abigail R Hymel
(74) *Attorney, Agent, or Firm* — BainwoodHuang

(57) ABSTRACT

Techniques are directed to utilizing a suspension protector to deflect debris away from a set of suspension components of a tracked vehicle. The tracked vehicle includes a vehicle body, a suspension, and a set of suspension protectors. The suspension couples with the vehicle body and is constructed and arranged to control movement of the vehicle body using tracks. Each suspension protector couples with the vehicle body and is disposed a predefined distance from a respective wheel of the suspension to deflect debris thrown from the respective wheel and a respective track away from a respective set of suspension components of the suspension.

20 Claims, 12 Drawing Sheets

(56) References Cited

U.S. PATENT DOCUMENTS

| | | | |
|---|---|---|---|
| 6,571,542 B1 | 6/2003 | Fillman et al. | |
| 6,729,114 B2 | 5/2004 | Fillman et al. | |
| 6,921,140 B2 | 7/2005 | Simons | |
| 6,938,400 B2 | 9/2005 | Fillman et al. | |
| 7,591,515 B2 | 9/2009 | Breton et al. | |
| 7,832,814 B2 | 11/2010 | Breton | |
| 8,474,554 B2 | 7/2013 | Howe et al. | |
| 9,772,712 B2 | 9/2017 | Kneuper et al. | |
| 9,873,468 B2 | 1/2018 | Howe et al. | |
| 10,318,057 B2 | 6/2019 | Kneuper et al. | |
| 10,435,136 B2 | 10/2019 | Poster | |
| 10,562,575 B2 | 2/2020 | Holowachuk | |
| 10,668,962 B2 | 6/2020 | Sauvageau et al. | |
| 10,745,065 B2 | 8/2020 | Howe et al. | |
| 10,906,520 B2 | 2/2021 | Hefner et al. | |
| D923,513 S | 6/2021 | Howe et al. | |
| D926,631 S | 8/2021 | Howe et al. | |
| D927,352 S | 8/2021 | Howe et al. | |
| 11,220,329 B2 | 1/2022 | Acee et al. | |
| 2005/0275287 A1 | 12/2005 | Breton | |
| 2008/0150355 A1* | 6/2008 | Breton | B62D 55/088 305/107 |
| 2009/0200859 A1 | 8/2009 | Matthys | |
| 2013/0221738 A1* | 8/2013 | Boivin | B62D 55/12 305/20 |

FOREIGN PATENT DOCUMENTS

| | | | |
|---|---|---|---|
| GB | 2561078 | 10/2018 | |
| WO | WO-2020013751 A1 * | 1/2020 | B62D 55/06 |

\* cited by examiner

UTILIZING A SUSPENSION PROTECTOR TO DEFLECT DEBRIS AWAY FROM A SET OF SUSPENSION COMPONENTS OF A TRACKED VEHICLE

BACKGROUND

A conventional tank includes a hull, continuous tracks along the sides of the hull, and a drive system. To move the conventional tank forward or backward, the drive system drives the continuous tracks in the same direction. To steer the conventional tank, the drive system speeds up one continuous track, slows down the other continuous track, or drives the continuous tracks in different directions.

Some conventional tanks may be equipped with scrapers which constantly contact certain track wheels to remove unwanted material. Along these lines, such scrapers peel off the unwanted material directly from the surfaces of the track wheels.

SUMMARY

Unfortunately, there are deficiencies to the above-described conventional tanks that simply use scrapers which constantly contact certain track wheels to remove unwanted material. For example, although the scrapers may do an adequate job of removing certain unwanted material such as clay and mud which sticks to the certain track wheels, the scrapers do not protect against debris which may be thrown from the track wheels and/or the tracks themselves causing excessive wear and/or damage to the track mechanics.

Rather, componentry such as neighboring wheels, bogies, shock absorbers, etc. is vulnerable to certain types of debris which does not stick to the track wheels such as rocks, branches, scrap materials, and so on. Even if the tank is provisioned with guards or bumpers to plow away taller objects in the path of the continuous tracks, the track wheels and the tracks would still be able to sweep up and launch any shorter debris remaining in the tank's path and thus cause wear and/or damage to the track mechanics. Moreover, the potential for causing damage from thrown debris may be particularly high when the tank is most vulnerable and performing certain maneuvers such as moving forward at top speed or quickly pivoting over the same spot (e.g., zero turning) where the continuous tracks turn in different directions at a high rate.

Additionally, the constant contact between the scrapers and the track wheels adds continuous resistance/interference when operating the continuous tracks. Furthermore, the constant contact between the scrapers and the track wheels causes the scrapers to wear out quickly.

In contrast to the above-identified conventional tanks that simply use scrapers which constantly contact certain track wheels to remove unwanted material, improved techniques are directed to utilizing suspension protectors that deflect debris thrown from wheels and/or tracks of a tracked vehicle away from suspension components of the tracked vehicle to protect the suspension components. Such suspension protectors are well suited for shielding neighboring wheels, bogies, shock absorbers, combinations thereof, etc. from the thrown debris. Additionally, such suspension protectors may be separated from the wheels and/or tracks by predefined distances (e.g., air gaps) thus preventing the suspension protectors from interfering with track operation and from wearing out quickly. Moreover, such suspension protectors may include removable hardware-mounted deflector plates enabling easy replacement, e.g., enabling use of different plates with different profiles to accommodate different environments/debris types, for quick and easy replacement due to deflector plate damage/wear, and so on.

One embodiment is directed to a suspension protector for a tracked vehicle. The suspension protector includes a deflector plate, a bracket, and hardware. The bracket is constructed and arranged to couple with a vehicle body of the tracked vehicle. The hardware is constructed and arranged to fasten the deflector plate to the bracket. The deflector plate defines a profile to reside at a predefined distance from a wheel of a suspension of the tracked vehicle to deflect debris thrown from the wheel and a track away from a set of suspension components of the suspension when the hardware fastens the deflector plate to the bracket and the bracket couples with the vehicle body.

Another embodiment is directed to a method of protecting a suspension of a tracked vehicle. The method includes coupling a bracket to a vehicle body of the tracked vehicle, aligning a deflector plate with the bracket, and while the deflector plate is aligned with the bracket, fastening the deflector plate to the bracket using hardware. The deflector plate resides at a predefined distance from a wheel of a suspension of the tracked vehicle to deflect debris thrown from the wheel and a track away from a set of suspension components of the suspension.

Yet another embodiment is directed to a tracked vehicle which includes a vehicle body, a suspension, and a set of suspension protectors. The suspension couples with the vehicle body and is constructed and arranged to control movement of the vehicle body using tracks. Each suspension protector couples with the vehicle body and is disposed a predefined distance from a respective wheel of the suspension to deflect debris thrown from the respective wheel and a respective track away from a respective set of suspension components of the suspension.

In some arrangements, the suspension includes a left track assembly having a left track and a set of left wheels controlling the left track, and a right track assembly having a right track and a set of right wheels controlling the right track. Additionally, the set of suspension protectors includes a left suspension protector mounted to a left wall of the vehicle body, the left suspension protector being separated from a particular left wheel of the left track assembly to deflect debris thrown from the particular left wheel and the left track away from a portion of the left track assembly. Furthermore, the set of suspension protectors includes a right suspension protector mounted to a right wall of the vehicle body, the right suspension protector being separated from a particular right wheel of the right track assembly to deflect debris thrown from the particular right wheel and the right track away from a portion of the right track assembly.

In some arrangements, the particular left wheel is a left drive sprocket that drives the left track. Additionally, the particular right wheel is a right drive sprocket that drives the right track.

In some arrangements, the left suspension protector includes a left deflector plate and a left bracket that mounts the left deflector plate to the vehicle body. Similarly, the right suspension protector includes a right deflector plate and a right bracket that mounts the right deflector plate to the vehicle body. Additionally, the left track rotates around the left deflector plate, and the right track rotates around the right deflector plate.

In some arrangements, hardware is used to fasten the left deflector plate to the left bracket and the right deflector plate to the right bracket. Such use of hardware (e.g., bolts, nuts, washers, etc.) enables easy replacement of the left deflector plate and the right deflector plate (e.g., without having to remove any suspension protector entirely from the vehicle body).

In some arrangements, the tracked vehicle further includes a set of replacement plates constructed and arranged to replace the left deflector plate and the right deflector plate. For example, the left deflector plate and the right deflector plate may have a first geometry to deflect a first type of debris away. Additionally, the replacement plates may have other geometries to deflect other types of debris.

In some arrangements, each of the left deflector plate and the right deflector plate has a V-shaped cross-section to define the first geometry. Additionally, one or more of the replacement plates have a non-V-shaped cross-section to define a second geometry.

In some arrangements, each bracket extends horizontally from a wall of the vehicle body. Accordingly, each bracket is able to position a deflector plate in an appropriate shielding location and orientation without interfering with neighboring suspension components.

In some arrangements, each deflector plate includes a seam, a first flat section extending away from the seam, and a second flat section extending away from the seam to provide the deflector plate with a V-shaped cross-section. Such a deflector plate may be formed of steel (e.g., cut and folded sheet stock, welded portions, combinations thereof, etc.) carbon fiber, plastics, other composites, other materials, combinations thereof, and so on.

In some arrangements, the first flat section of each deflector plate has a first outer edge opposite the seam of that deflector plate. The second flat section of each deflector plate has a second outer edge opposite the seam of that deflector plate. The first and second flat sections of each deflector plate extend in downward directions from the seam such that the seam is higher than the first and second edges.

In some arrangements, each deflector plate further has a first tab that extends outward from the first flat section and a second tab that extends outward from the second flat section. The first tab extends from the first flat section in a first upward direction and the second tab extends from the second flat section in a second upward direction that is different from the first upward direction.

Other embodiments are directed to apparatus, devices, assemblies, and so on. Some embodiments are directed to various methods, systems, and componentry which are involved in utilizing a suspension protector to deflect debris away from a set of suspension components of a tracked vehicle.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to utilizing a suspension protector that deflects debris thrown from a wheel and/or a track of a tracked vehicle away from suspension components of the tracked vehicle to protect the suspension components. Such a suspension protector is well suited for protecting suspension componentry such as neighboring wheels, bogies, shock absorbers, and so on from the thrown debris. Additionally, such a suspension protector may be separated from the wheel and/or the track by a predefined distance (e.g., an air gap) thus preventing the suspension protector from interfering with track operation and from wearing out quickly. Moreover, such a suspension protector may include a removable hardware-mounted deflector plate enabling easy replacement, e.g., enabling use of different plates with different profiles to accommodate different environments/ debris types, for quick and easy replacement due to deflector plate damage/wear, etc.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
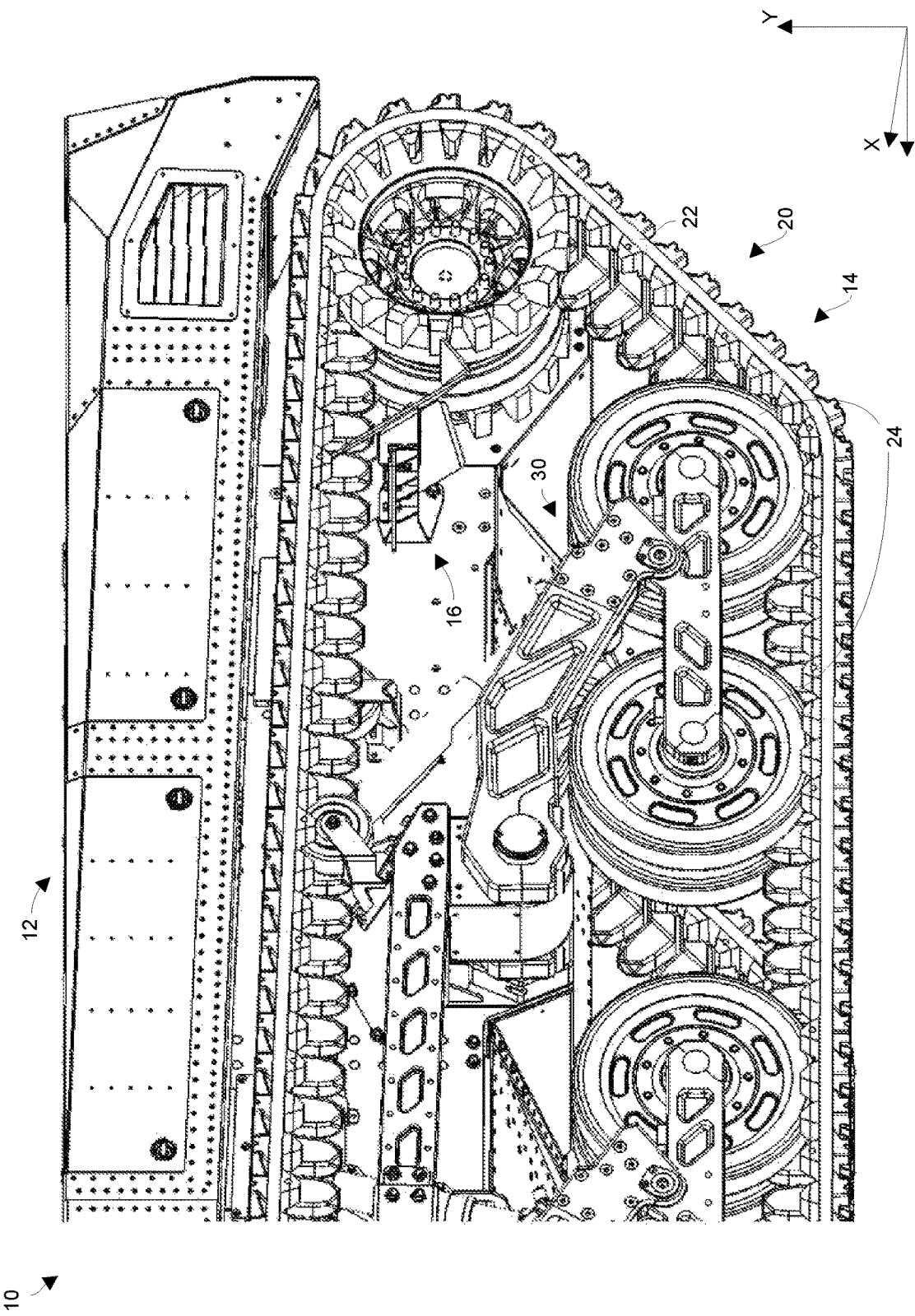
FIGS. 1 and 2 are side views of at least a portion of tracked vehicle which utilizes a set of suspension protectors in accordance with certain embodiments.
Figure 2:
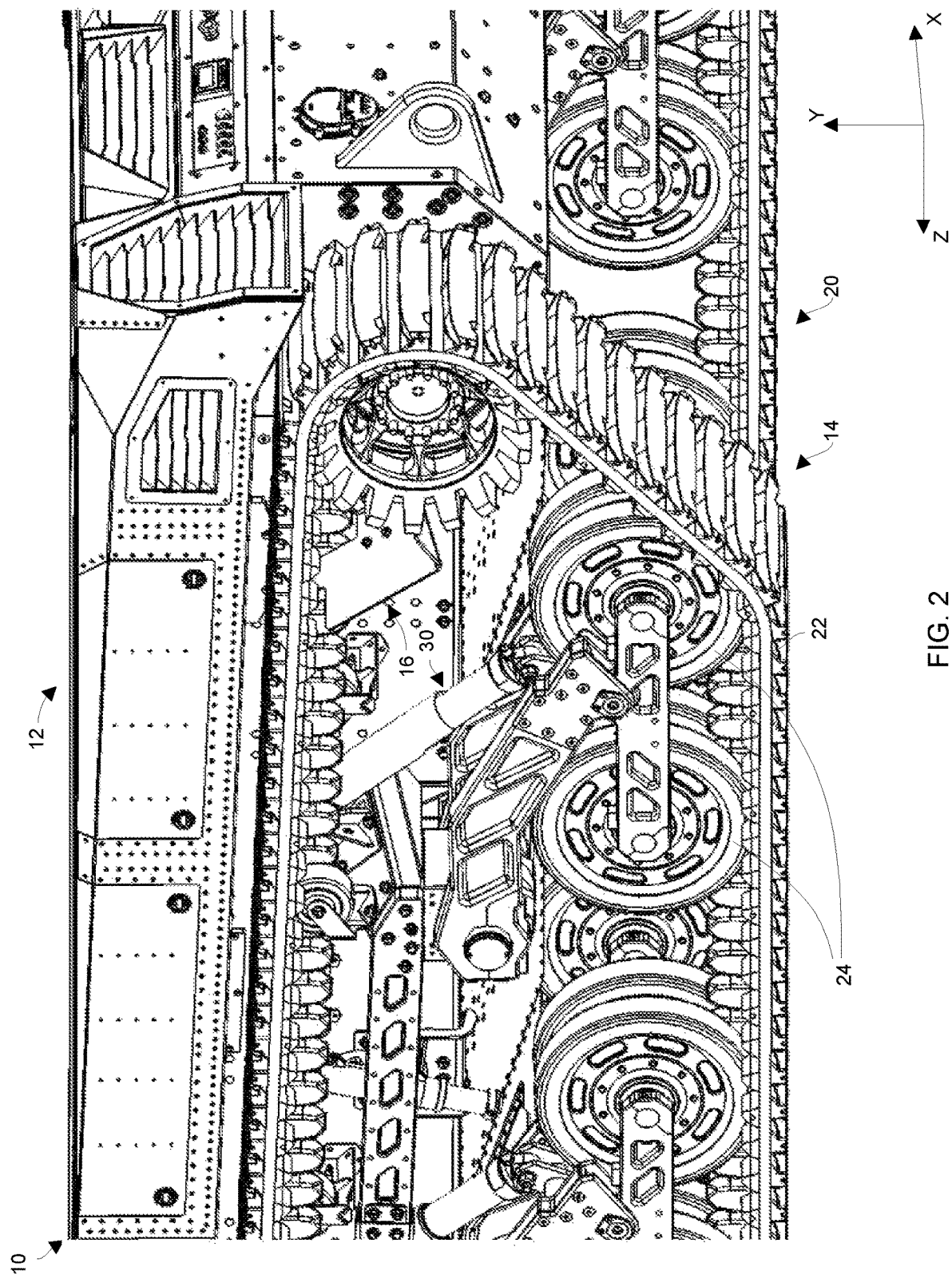

FIGS. 1 and 2 show a tracked vehicle 10 which utilizes a set of suspension protectors that deflects thrown debris in accordance with certain embodiments. The tracked vehicle 10 includes a vehicle body 12, a suspension 14, and a set of suspension protectors 16.

By way of example, the tracked vehicle 10 may take the form of a tank or military vehicle with a similar form factor. Nevertheless, it should be understood that other types of tracked vehicles 10 are suitable as well such as construction equipment (e.g., backhoes, bull dozers, loaders, etc.), winter-related machinery (e.g., snow grooming equipment, snowmobiles, etc.), all-terrain vehicles, farming and other agricultural equipment, specialized equipment for climbing and/or maneuvering over hazardous environments, and so on. Furthermore, other types of vehicles are suitable for use as well such as robots, water vehicles, submersible vehicles, and so on.

The vehicle body 12 is constructed and arranged to carry various objects such as people, machinery, electronics, cargo, robotics, surveillance equipment, munitions, payloads, other craft, other types of equipment, combinations thereof, and so on. It should be understood that the vehicle body 12 is shown as a tank by way of example only and that the vehicle body 12 may have different geometries, weights/sizes/scales/etc., footprints, purposes, and so on.

The suspension 14 is constructed and arranged to provide tracked vehicle movement. To this end, the suspension 14 includes multiple track assemblies 20. Each track assembly 20 includes a continuous rack 22 and a set of wheels 24. The track 22 of each track assembly 20 is driven by an engine, a transmission, etc. The set of wheels 24 provide drive and guidance and to control movement of the continuous track 22. For example, the set of wheels may include a drive sprocket towards the back end of the track assembly 20, and idler wheels to support and guide the track 22.

In accordance with certain embodiments, the suspension 14 includes (i) a left track assembly 20 having a left track 22 and a set of left wheels 24 controlling the left track 22, and (ii) a right track assembly 20 having a right track 22 and a set of right wheels 24 controlling the right track 22.

It should be understood that the suspension 14 includes other componentry 30 as well. Suitable examples for such componentry 30 include one or more of the following: support beams, shock absorbers, other hydraulics, bogies, struts, track guides, springs, other wheels, hardware, and so on.

Each suspension protector 16 is constructed and arranged to deflect debris away from various componentry 30 of the suspension 14. It should be understood that such debris may be thrown from one or more wheels 24 (e.g., a drive sprocket, an idler wheel, etc.), the track 22, and so on, during tracked vehicle maneuvers. However, with the debris deflected away from the suspension componentry 30, such componentry 30 is protected from unnecessary wear, damage, failure, track derailment, and so on. Further details will now be provided with reference to FIGS. 2 through 4.

Figure 3:
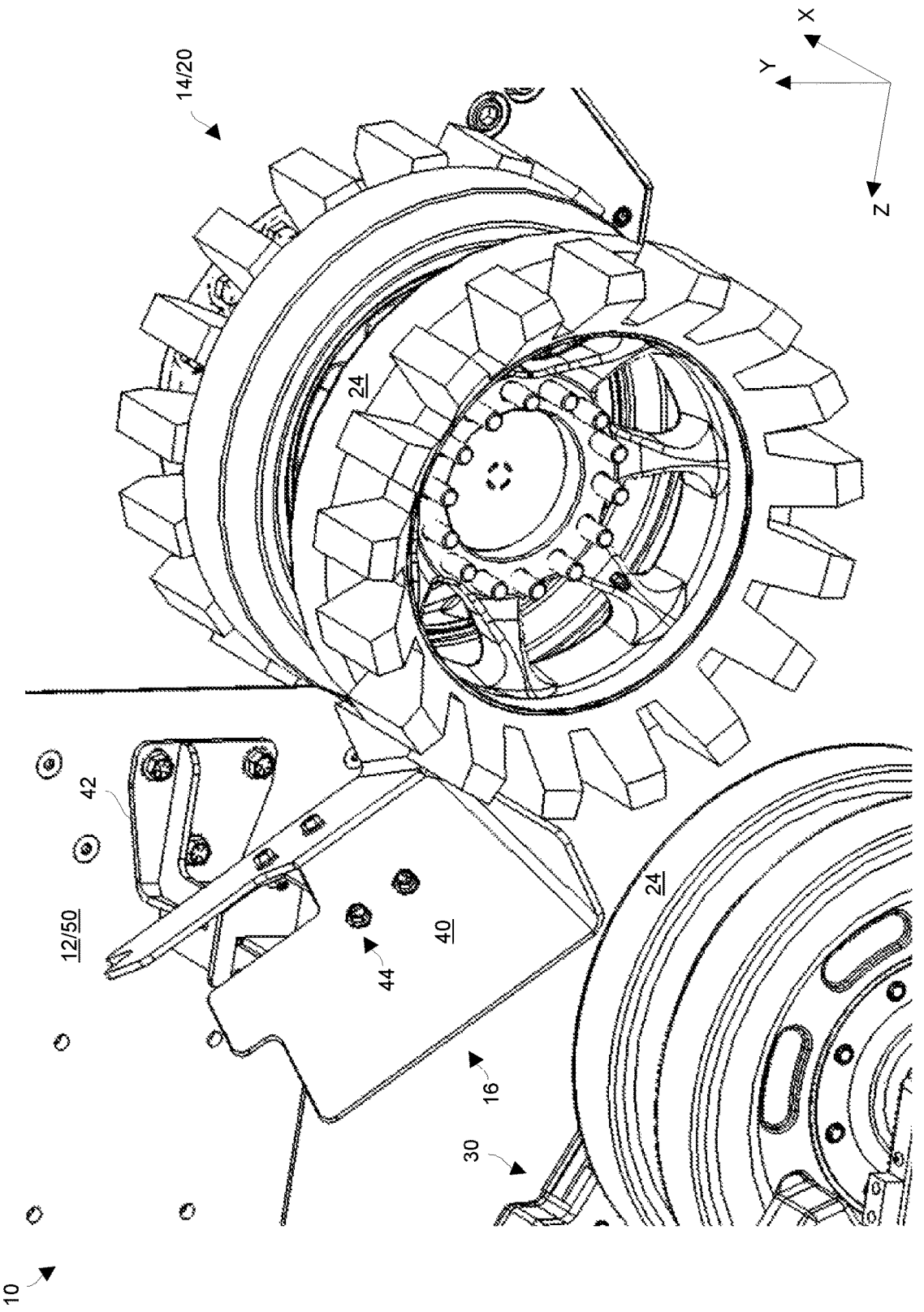
FIG. 3 is a perspective view of certain details of the tracked vehicle from a first angle in accordance with certain embodiments.
Figure 4:
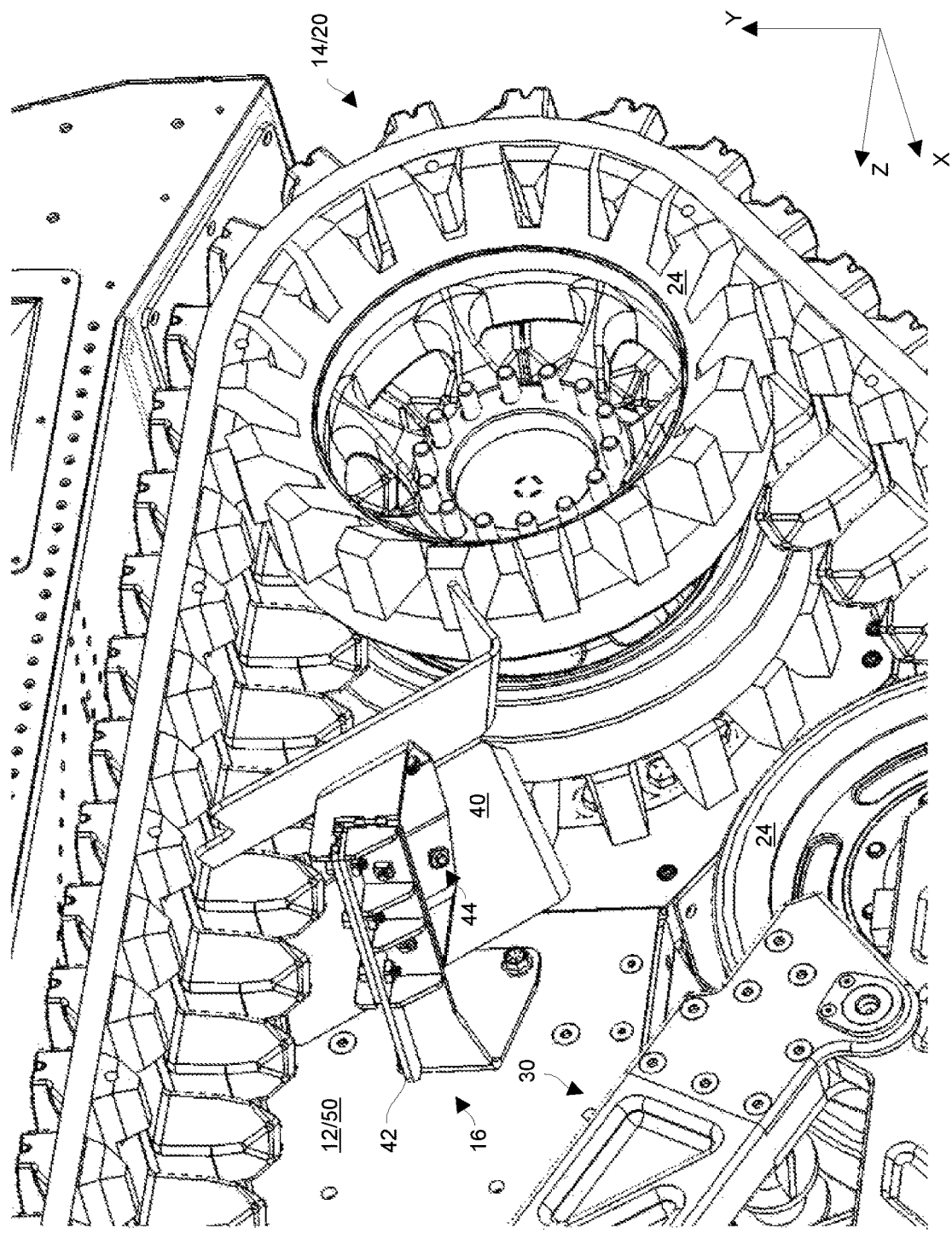
FIG. 4 is a perspective view of certain details of the tracked vehicle from a second angle in accordance with certain embodiments.
Figure 5:
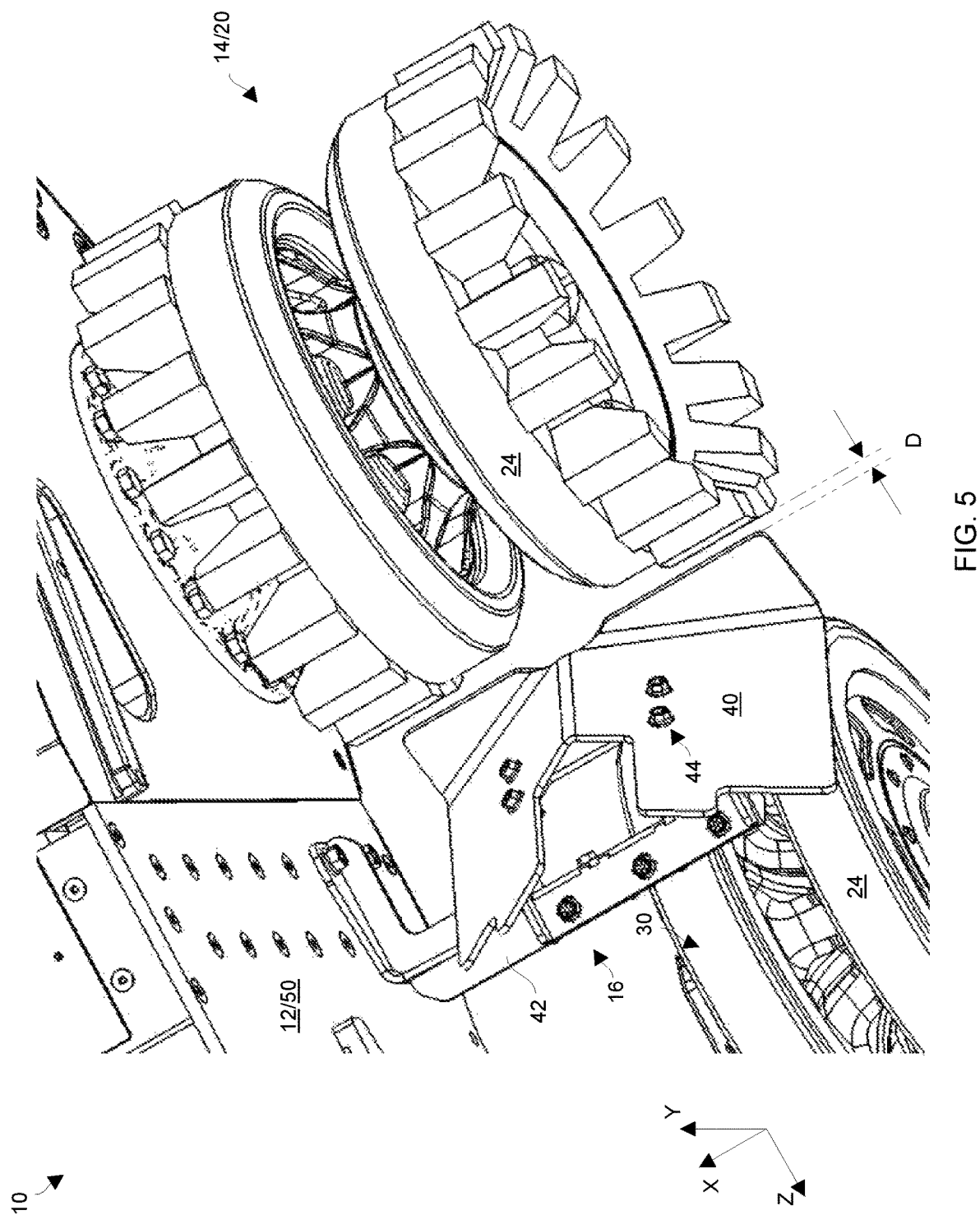
FIG. 5 is a perspective view of certain details of the tracked vehicle from a third angle in accordance with certain embodiments.

FIGS. 3 through 5 show particular details of a suspension protector 16 mounted to the vehicle body 12 on a left side of the tracked vehicle 10 in accordance with certain embodiments. FIG. 3 shows a portion of the left side of the tracked vehicle 10 from an elevated rear perspective. FIG. 4 shows a portion of the left side of the tracked vehicle 10 from a lower front perspective. FIG. 5 shows a portion of the left side of the tracked vehicle 10 from an elevated front perspective.

In accordance with certain embodiments, the details provided in connection with FIGS. 3 through 5 apply to both sides of the tracked vehicle 10. However, it should be understood that, in some situations, the details simply apply to one side of the tracked vehicle 10.

As shown in FIGS. 3 through 5, a suspension protector 16 includes a deflector plate 40, a bracket 42, and mounting hardware 44. Suitable materials for one or more of these components include steel, other metals, carbon fiber, plastics, similar materials, combinations thereof, and so on.

The deflector plate 40 is constructed and arranged to deflect away debris moving toward the suspension componentry 30 to protect the suspension componentry 30. Such debris may include materials such as rocks, rubble, sand, ice, wood, junk, garbage, scraps and other ground clutter, combinations thereof, etc. that may be picked up and ejected by a wheel 24, the track 22, etc.

The bracket 42 (e.g., see FIG. 4) is constructed and arranged to couple with the vehicle body 12 of the tracked vehicle 10. In some arrangements, the bracket 42 mounts to a wall 50 of the vehicle body 12 and extend outward from the wall 50 horizontally (i.e., along the X-axis). For example, the bracket 42 may bolt on to fastening locations on the wall 50 of the vehicle body 12.

The hardware 44 (FIG. 2) is constructed and arranged to fasten the deflector plate 40 with the bracket 42. The hardware 44 may also be used to mount the bracket 42 to the vehicle body 12. Such hardware 44 may include bolts, nuts, washers, etc. which enable attachment and detachment of the deflector plate 40 (e.g., for deflector plate 40 replacement).

As best seen in FIG. 5, the design and/or profile of the deflector plate 40 enables the deflector plate 40 to reside at a predefined distance (D) from a wheel 24 of a suspension 14 of the tracked vehicle 10 to deflect debris thrown from the wheel 24 and a track 22 away from a set of suspension components 30 of the suspension 14. That is, there is an air gap and no contact between the suspension protector 16 and the suspension 14 to prevent interference, but the suspension protector 16 nevertheless provides rich and robust protection to componentry 30 (e.g., another wheel 24, hydraulics, support beams, etc.) of the suspension 14.

By way of example, the suspension protector 16 is shown in FIGS. 3 through 5 as protecting a portion of the suspension 14 from debris ejected from a drive sprocket and/or where the track is driven by the drive sprocket and where the debris may be launched at high velocity. Nevertheless, the suspension protector 16 is also suitable for use in other locations where other portions of the suspension 14 are vulnerable to flying debris. Further details will now be provided with reference to FIGS. 6 through 9.

Figure 6:
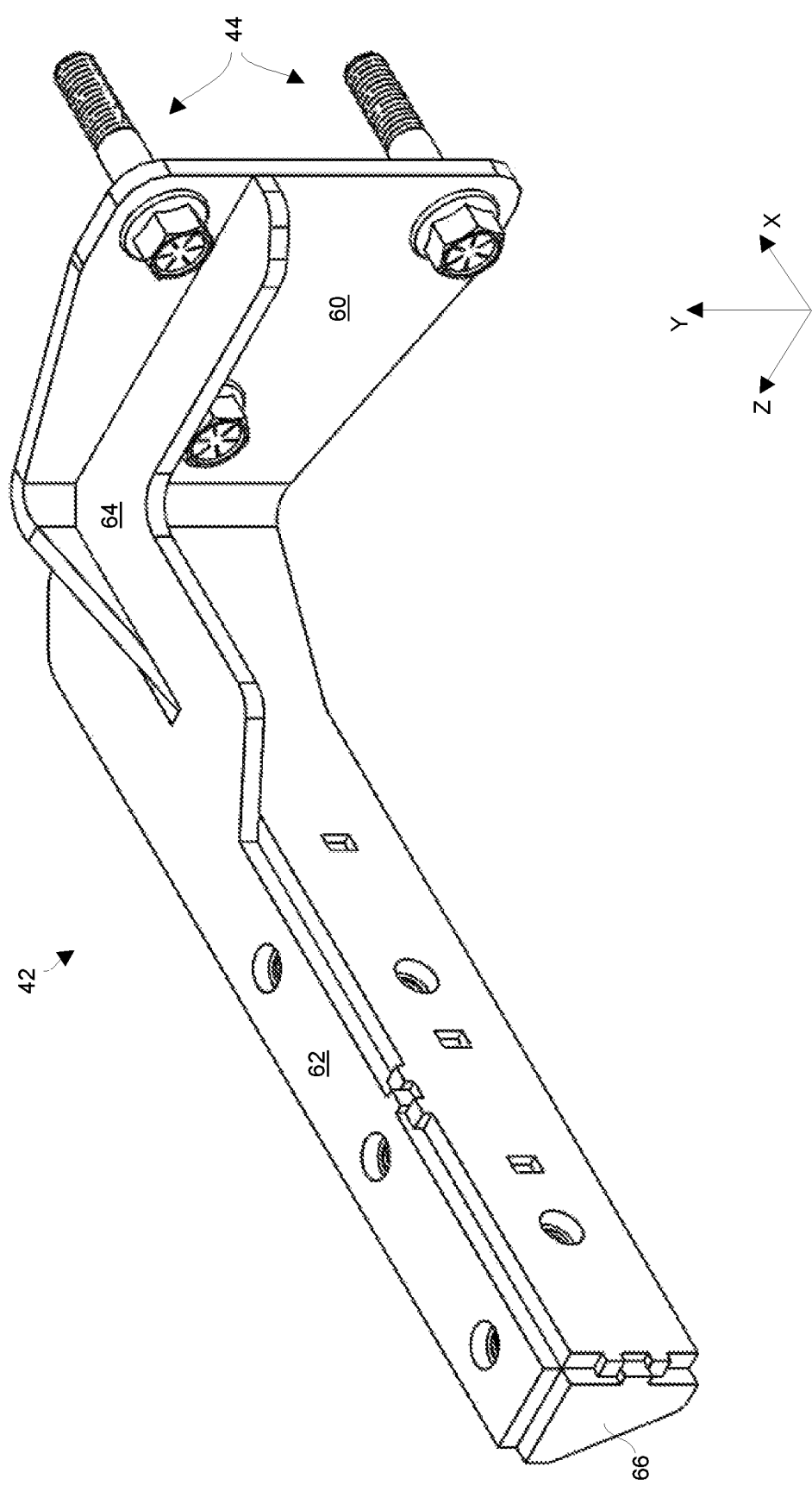
FIG. 6 is a perspective view of a bracket from a first angle in accordance with certain embodiments.
Figure 7:
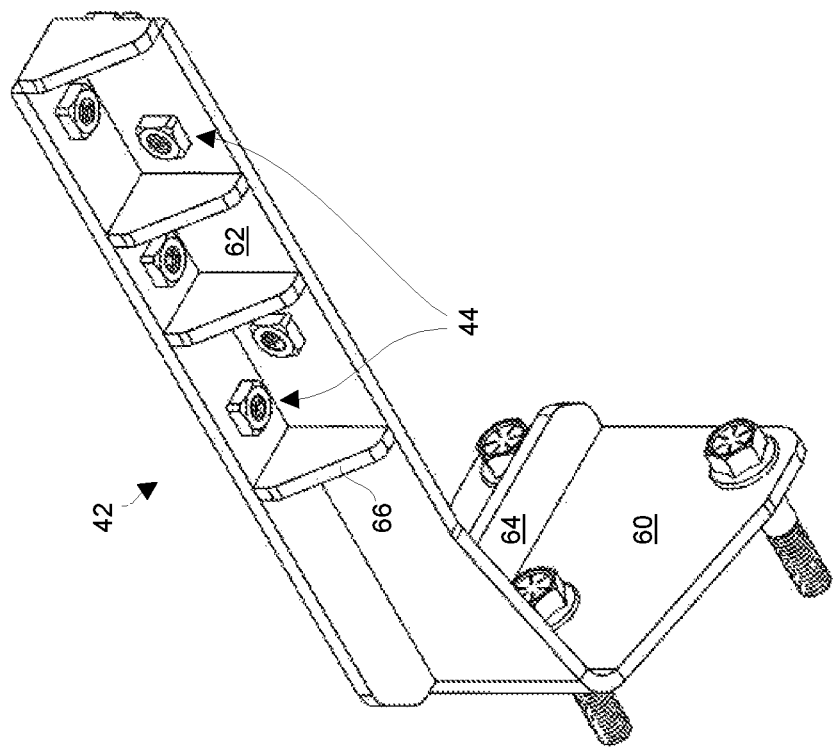
FIG. 7 is a perspective view of the bracket from a second angle in accordance with certain embodiments.
Figure 8:
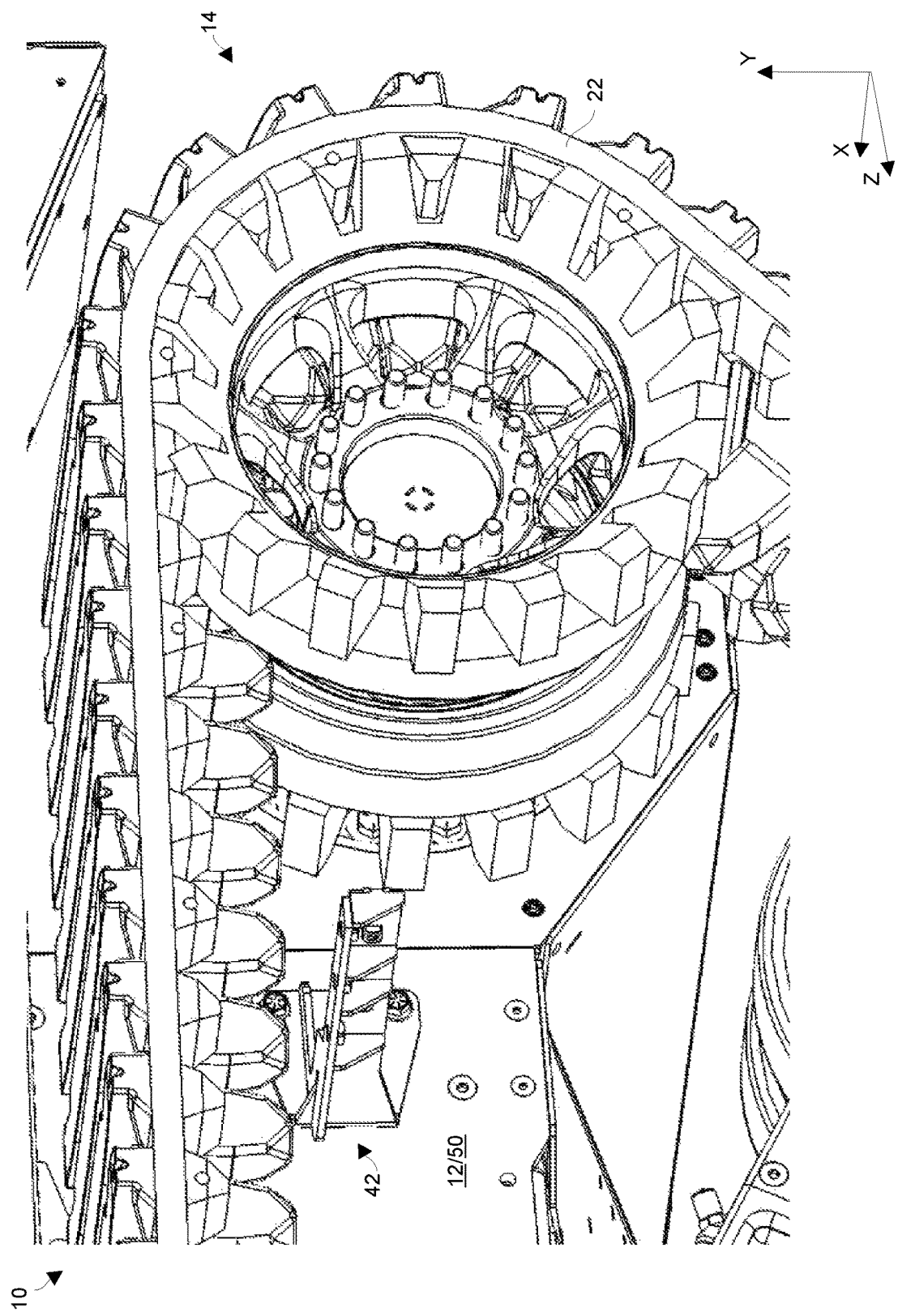
FIG. 8 is an installed view of the bracket from a third angle in accordance with certain embodiments.
Figure 9:
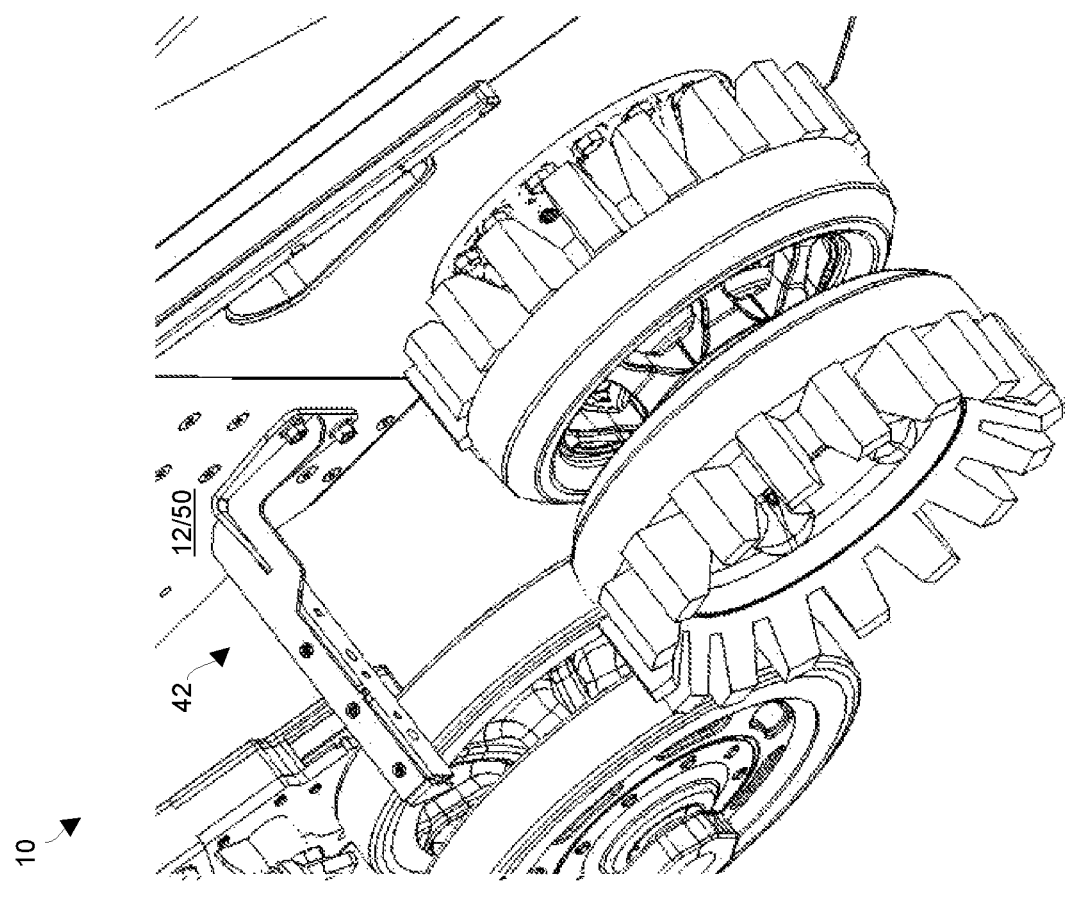
FIG. 9 is an installed view of the bracket from a third angle in accordance with certain embodiments.

FIGS. 6 through 9 show further details of the suspension protector 16 in accordance with certain embodiments. FIGS. 6 and 7 show isolated views of the bracket 42 and certain mounting hardware 44 of the suspension protector 16 in accordance with certain embodiments. FIGS. 8 and 9 show installed views of the bracket 42 in accordance with certain embodiments.

As can be seen in FIGS. 6 and 7, the bracket 42 includes a mounting section 60 that fastens to the vehicle body 12, a support arm 62 that fastens to and extends from the deflector plate 40, and a diagonal beam 64 that couples with the mounting section 60 and the support arm 62 for additional strength. The mounting section 60 defines holes to enable robust and reliable attachment to the wall 50 of the vehicle body 12 via the hardware 44. Similarly, the support arm 62 defines holes to enable robust and reliable attachment of the deflector plate 40 via the hardware 44.

It should be understood that the bracket 42 may include other features based on the material and process for manufacturing the bracket 42. Along these lines, if the bracket 42 is made of cut and folded steel sheet stock, the bracket may include one or more additional braces/tabs/supports/etc. 66 (e.g., bent into place, welded on, etc.) for additional strength, and so on.

As seen in FIGS. 8 and 9, when the bracket 42 is properly mounted to the wall 50 of the vehicle body 12, the bracket 42 extends horizontally (e.g., in the negative X-direction) within an area that is encircled by the continuous track 22. Such a design enables optimal positioning of the deflector plate 40 without interfering with (e.g., contacting) the suspension 14. Further details will now be provided with reference to FIGS. 10 and 11.

Figure 10:
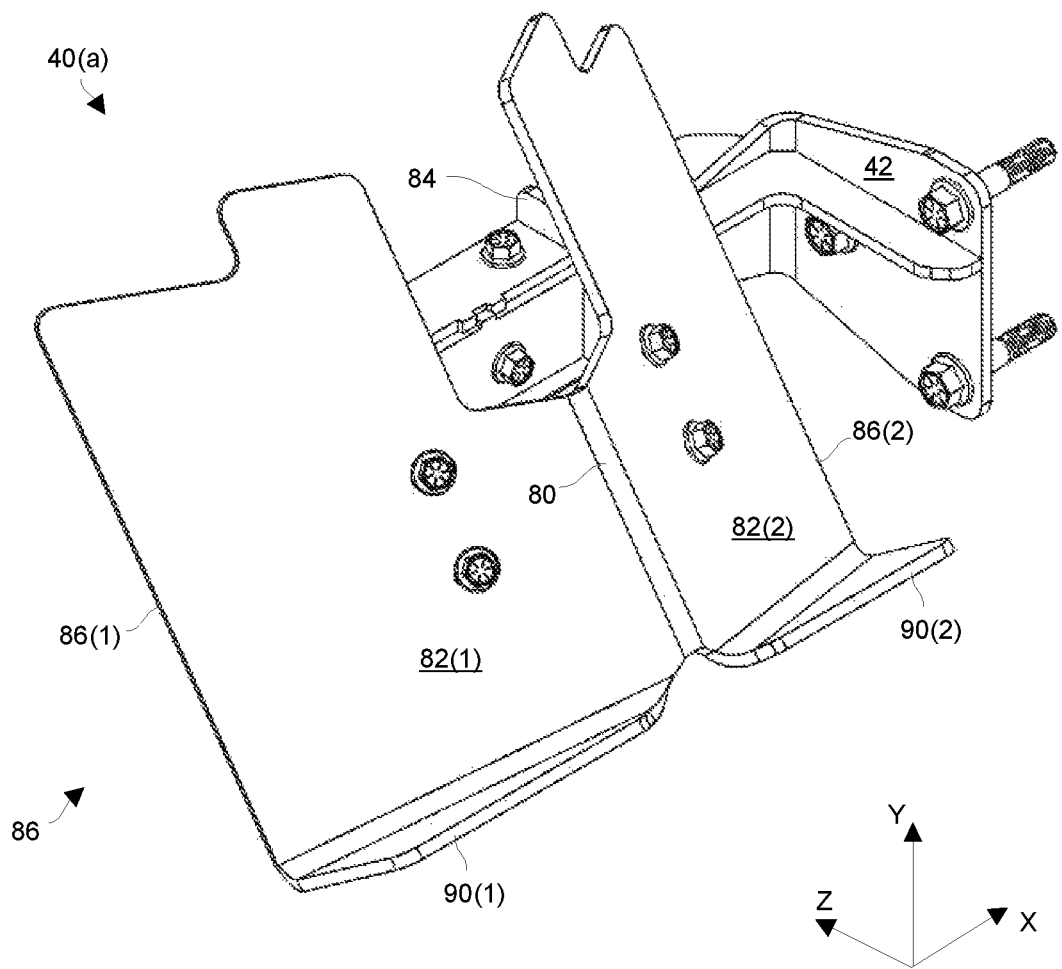
FIG. 10 is a perspective view of a deflector plate in accordance with certain embodiments.
Figure 11:
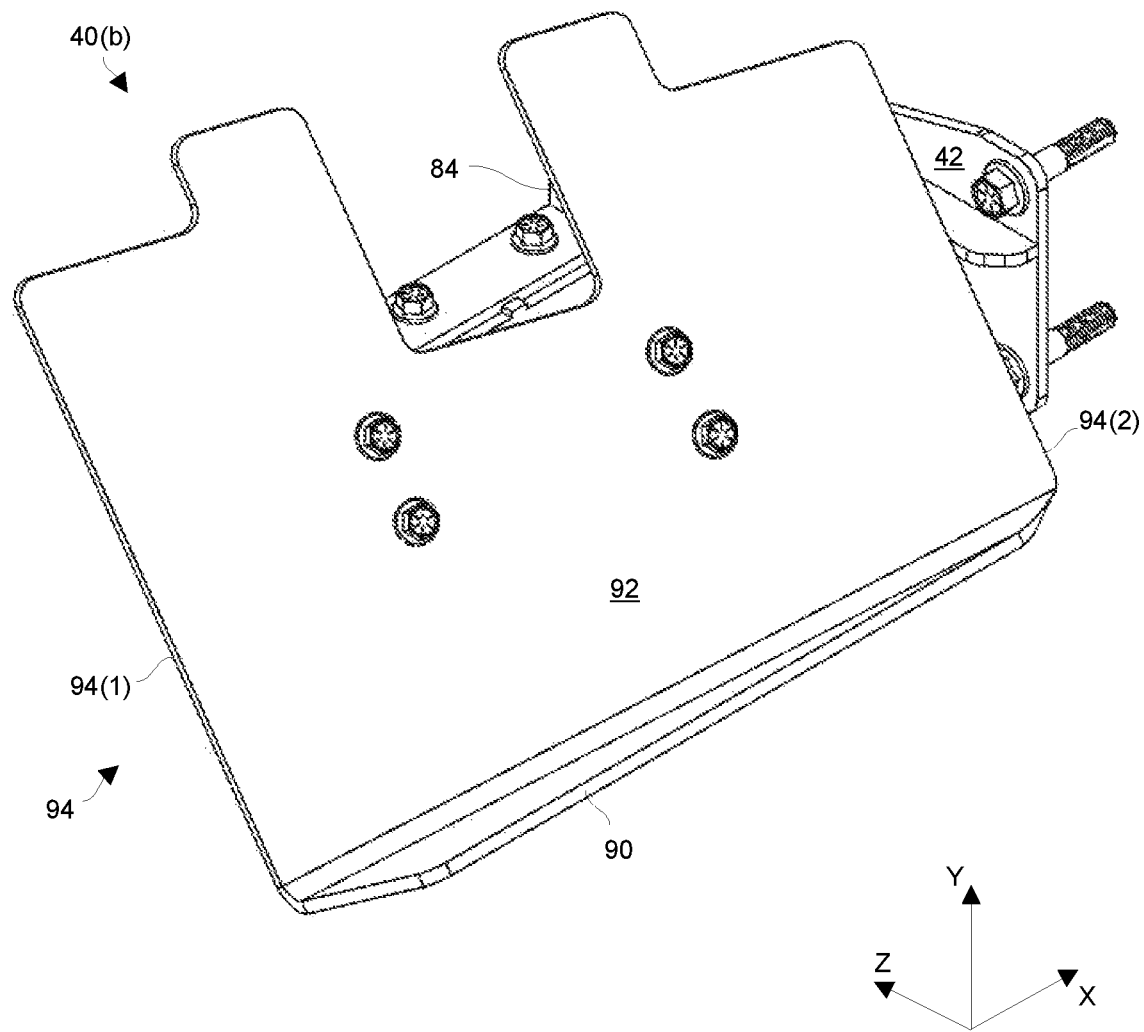
FIG. 11 is a perspective view of another deflector plate in accordance with certain embodiments.

FIGS. 10 and 11 show further details of example deflector plates 40 in accordance with certain embodiments. FIG. 10 show a first example deflector plate 40(a) in accordance with certain embodiments. FIG. 11 show a second example deflector plate 40(b) in accordance with certain embodiments.

As shown in FIG. 10, the first example deflector plate 40(a) is generally symmetrical along the Y-Z plane. Due to this symmetric design, the same deflector plate 40(a) may be used on either side of the tracked vehicle 10 rather than require a left side design and a right side design (i.e., a common part for either side of the vehicle 10).

The deflector plate 40(a) includes a seam 80, a first flat section 82(1) extending away from one side of the seam 80, and a second flat section 82(2) extending away from another side of the seam 80 to provide the deflector plate 40(a) with a V-shaped cross-section. The deflector plate 40(a) may further include other features 84 such as tabs, support members, beams, etc. to improve strength, the ease of mounting to the bracket 42, and so on.

The first flat section 82(1) has a first outer edge 86(1) opposite the seam 80. Likewise, the second flat section 82(2) has a second outer edge 86(2) opposite the seam 80. When the deflector plate 40(a) is installed on vehicle body 12, the seam is higher (e.g., in the Y-direction) than the outer edges 86(1), 86(2) (collectively, outer edges 86) of the deflector plate 40(a). Accordingly, debris hitting the deflector plate 40(a) will be directed to either side of the suspension 14 rather than the suspension 14 itself. Thus, the suspension componentry 30 behind the deflector plate 40(a) (e.g., see FIGS. 1 through 5) is well shielded against damage from debris thrown and/or dropped in the direction of the suspension componentry 30.

As further shown in FIG. 10, the first example deflector plate 40(a) further includes a first tab 90(1) that extends outward from the first flat section 82(1) and a second tab 90(2) that extends outward from the second flat section 82(2). The tabs 90(1), 90(2) (collectively, tabs 90) extend upward from their respective flat sections 82 in different directions 92(1), 92(2), respectively (e.g., perpendicularly from their respective flat sections 82).

Such tabs 90 further prevent debris from encountering the suspension 14. In particular, any debris that may have hit a flat section 82 and is falling toward the air gap (D) can be caught by a tab 90 to fall to either side of the suspension 14 rather than lodge in the air gap (D) and/or cause damage.

With regard to the second example deflector plate 40(b) certain features, operation, and advantages mentioned above in connection with the first example deflector plate 40(a) similarly apply to the second example deflector plate 40(b). It should be understood that FIG. 11 shows a second example deflector plate 40(b) for the left side of the vehicle 10 and a similar second example deflector plate 40(b) may be used on the right side of the vehicle 10 (e.g., one having a mirrored configuration to that shown in FIG. 11).

As shown in FIG. 11, the second example deflector plate 40(b) includes flat section 92 which is configured to pitch away from the vehicle body 12 (also see FIGS. 1 through 5). In particular, a first outer edge 94(1), which when installed is furthest away from the vehicle body 12, is lower than the second outer edge 94(2). Accordingly, debris hitting the deflector plate 40(b) will be directed away from the vehicle body 12. Such a deflector plate 40(b) may be better suited that the deflector plate 40(a) for certain applications, for deflecting certain types of debris, for protecting certain equipment of the vehicle 10, combinations thereof, and so on.

It should be understood that the deflector plates 40(a), 40(b) are disclosed herein by way of example only and that other profiles are suitable for the deflector plate 40. Moreover, different deflector plates 40 may be interchanged/replaced not only due to wear or damage, but also due to particular applications and/or environments. For example, the deflector plate 40(a) may be well suited for snowy or sandy environments or for traveling at high speeds where it is unlikely that debris will fall between the air gap (also see FIG. 5). However, the deflector plate 40(b) may be well suited for rocky environments or for traveling at low speeds where it is more likely that hard, small debris will fall toward the air gap only to be blocked before passing through the air gap (also see FIG. 5). Further details will now be provided with reference to FIG. 12.

Figure 12:
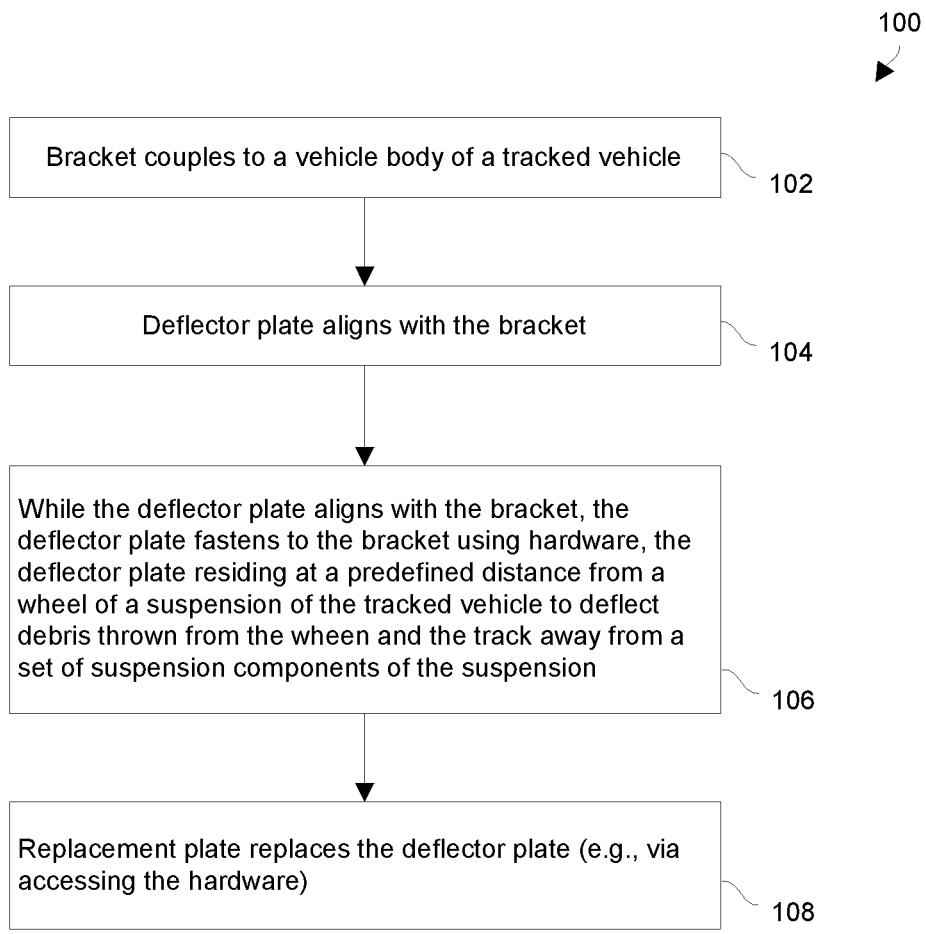
FIG. 12 is a flowchart of a procedure which is performed in accordance with certain embodiments.

FIG. 12 is a flowchart of a procedure 100 for protecting a suspension of a tracked vehicle in accordance with certain embodiments.

At 102, the bracket couples to a vehicle body of the tracked vehicle. For example, the bracket may bolt on to a wall of the vehicle body.

At 104, the deflector plate aligns with the bracket. For example, holes within the bracket and the deflector plate may be brought into alignment for hardware mounting.

At 106, while the deflector plate is aligned with the bracket, the deflector plate fastens to the bracket using hardware. For example, bolts may insert through holes of the bracket and the deflector plate and then washers and nuts may be used to tighten down the bolts thus securing the bracket and the deflector plate together. The deflector plate now resides at a predefined distance from a wheel of a suspension of the tracked vehicle to deflect debris thrown from the wheel and a track away from a set of suspension components of the suspension.

At 108, a replacement plate replaces the initial deflector plate. For example, the reflector plate may have a different profile that is better suited for a new environment within which the tracked vehicle will now operate.

As described above, improved techniques are directed to utilizing suspension protectors 16 that deflect debris thrown from wheels 24 and/or tracks 22 of a tracked vehicle 10 away from suspension components 30 of the tracked vehicle 10 to protect the suspension components 30. Such suspension protectors 16 are well suited for shielding neighboring wheels, bogies, shock absorbers, combinations thereof, etc. from the thrown debris. Additionally, such suspension protectors 16 may be separated from the wheels 24 and/or the tracks 22 by predefined distances (e.g., air gaps) thus preventing the suspension protectors 16 from interfering with track operation and from wearing out quickly. Moreover, such suspension protectors 16 may include removable hardware-mounted deflector plates 40 enabling easy replacement, e.g., enabling use of different plates 40 with different profiles to accommodate different environments/debris types, for quick and easy replacement due to deflector plate damage/wear, and so on.

While various embodiments of the present disclosure have been particularly shown and described, it will be understood by those skilled in the art that various changes in form and details may be made therein without departing from the spirit and scope of the present disclosure as defined by the appended claims.

It should be understood that, in certain situations such as zero turning, a continuous track of a tracked vehicle may scoop aggregate and other debris into the inside of the track. For example, when the track rotates to move the vehicle forward, the debris is transported along the track and up around the drive sprocket, then thrown forward by the drive sprocket. Without the suspension protector disclosed herein in place, the suspension components could experience excessive abuse beyond what they were intended to withstand in ordinary operation. However, with the suspension protector installed in front of the drive sprocket, the suspension protector deflects debris being ejected from the drive sprocket and sends the aggregate either away from the vehicle or underneath the chassis between the tracks.

In accordance with certain embodiments, a bracket installed on the outer wall of the hull of the vehicle is placed in front of the drive sprocket. A separate part is attached to the bracket that is shaped to deflect an intended type of debris such as snow, sand, rocks, etc. This separate part can be replaced after wearing out, or can be swapped out for a different part depending on the environment the machine is being operated in. Generally, this part is shaped like a V-plow to guide the debris away from the center plane of the track. The top profile of the part follows the contours of the inner track profile to catch as much debris as possible.

It should be understood that conventional scrapers, as opposed to suspension protector operating as a deflective shield, simply removes unwanted material stuck on wheel surfaces. Such conventional scrapers require sliding contact with the drive sprocket or idler wheel so that debris is physically peeled from the surface of the moving part. In contrast, in accordance with certain embodiments, the suspension protector has a significant air gap between it and the drive sprocket, relying solely on the sprocket throwing aggregate forward.

It should be understood that the tracked vehicle was described above as a tank by way of example only. Other types of tracked vehicles are suitable for use as well such as those for the agriculture industry, off road tracked vehicles, high speed track applications, and so on. Such modifications and enhancements are intended to belong to various embodiments of the disclosure.

What is claimed is:

1. A tracked vehicle, comprising:
   a vehicle body;
   a suspension coupled with the vehicle body, the suspension being constructed and arranged to control movement of the vehicle body using tracks;
   a set of suspension protectors, each suspension protector of the set of suspension protectors coupling with the vehicle body and being disposed a predefined distance from a respective wheel of the suspension to deflect debris thrown from the respective wheel and a respective track away from a respective set of suspension components of the suspension;
   wherein each suspension protector of the set of suspension protectors includes a deflector plate and a bracket that mounts the deflector plate to the vehicle body;
   wherein at least one of the deflector plates is a particular deflector plate that includes a seam, a first flat section extending away from the seam, and a second flat section extending away from the seam to provide the deflector plate with a V-shaped cross-section; and
   wherein the first flat section of the particular deflector plate extends in a downward direction away from the vehicle body to deflect debris encountered from above in a downward direction and away from the suspension.

2. A tracked vehicle as in claim 1 wherein the suspension includes:
   a left track assembly having a left track and a set of left wheels controlling the left track, and
   a right track assembly having a right track and a set of right wheels controlling the right track; and
   wherein the set of suspension protectors includes:
   a left suspension protector mounted to a left wall of the vehicle body, one of the set of left wheels being a particular left wheel of the left track assembly, the left suspension protector being separated from the particular left wheel of the left track assembly to deflect debris thrown from the particular left wheel and the left track away from a portion of the left track assembly, and
   a right suspension protector mounted to a right wall of the vehicle body, one of the set of right wheels being a particular right wheel of the right track assembly, the right suspension protector being separated from the particular right wheel of the right track assembly to deflect debris thrown from the particular right wheel and the right track away from a portion of the right track assembly.

3. A tracked vehicle as in claim 2 wherein the particular left wheel is a left drive sprocket that drives the left track; and
   wherein the particular right wheel is a right drive sprocket that drives the right track.

4. A tracked vehicle as in claim 2 wherein the left suspension protector includes a left deflector plate and a left bracket that mounts the left deflector plate to the vehicle body;
   wherein the left track rotates around the left deflector plate;
   wherein the right suspension protector includes a right deflector plate and a right bracket that mounts the right deflector plate to the vehicle body; and
   wherein the right track rotates around the right deflector plate.

5. A tracked vehicle as in claim 4 wherein, using hardware, the left deflector plate fastens to the left bracket and the right deflector plate fastens to the right bracket to enable replacement of the left deflector plate and the right deflector plate.

6. A tracked vehicle as in claim 4, further comprising:
   a set of replacement plates constructed and arranged to replace the left deflector plate and the right deflector plate.

7. A tracked vehicle as in claim 4 wherein each bracket extends horizontally from a wall of the vehicle body.

8. A tracked vehicle as in claim 6 wherein each of the left deflector plate and the right deflector plate has a first geometry to deflect a first type of debris away; and
   wherein each of the set of replacement plates has a second geometry to deflect a second type of debris, the second geometry being different from the first geometry.

9. A tracked vehicle as in claim 8 wherein each of the left deflector plate and the right deflector plate has the V-shaped cross-section to define the first geometry; and
   wherein each of the set of replacement plates has a non-V-shaped cross-section to define the second geometry.

10. A tracked vehicle as in claim 1 wherein the first flat section of each deflector plate has a first outer edge opposite the seam of that deflector plate;
    wherein the second flat section of each deflector plate has a second outer edge opposite the seam of that deflector plate; and
    wherein the first and second flat sections of each deflector plate extend in downward directions from the seam.

11. A tracked vehicle as in claim 10 wherein each deflector plate further has a first tab that extends outward from the first flat section and a second tab that extends outward from the second flat section, the first tab extending from the first flat section in a first upward direction and the second tab extending from the second flat section in a second upward direction that is different from the first upward direction.

12. A tracked vehicle as in claim 1 wherein the particular deflector plate includes:
a section of metal sheet stock folded to provide the seam and flat sections forming the V-shaped cross section.

13. A suspension protector for a tracked vehicle, the suspension protector comprising:
a deflector plate;
a bracket constructed and arranged to mount the deflector plate to a vehicle body of the tracked vehicle; and
hardware constructed and arranged to fasten the deflector plate to the bracket;
the deflector plate defining a profile to reside at a predefined distance from a wheel of a suspension of the tracked vehicle to deflect debris thrown from the wheel and a track away from a set of suspension components of the suspension when the hardware fastens the deflector plate to the bracket and the bracket couples with the vehicle body;
wherein the deflector plate includes a seam, a first flat section extending away from the seam, and a second flat section extending away from the seam to provide the deflector plate with a V-shaped cross-section; and
wherein the first flat section of the particular deflector plate extends in a downward direction away from the vehicle body to deflect debris encountered from above in a downward direction and away from the suspension.

14. A suspension protector as in claim 13, further comprising:
a replacement plate constructed and arranged to replace the deflector plate.

15. A suspension protector as in claim 14 wherein the deflector plate has a first geometry to deflect a first type of debris away; and
wherein the replacement plate has a second geometry to deflect a second type of debris, the second geometry being different from the first geometry.

16. A suspension protector as in claim 15 wherein the deflector plate has the V-shaped cross-section to define the first geometry; and
wherein the replacement plate has a non-V-shaped cross-section to define the second geometry.

17. A suspension protector as in claim 13 wherein the first flat section has a first outer edge opposite the seam;
wherein the second flat section has a second outer edge opposite the seam; and
wherein the first and second flat sections extend in downward directions from the seam.

18. A suspension protector as in claim 17 wherein the deflector plate further includes a first tab that extends outward from the first flat section and a second tab that extends outward from the second flat section, the first tab extending from the first flat section in a first upward direction and the second tab extending from the second flat section in a second upward direction that is different from the first upward direction when the bracket couples with the vehicle body and the deflector plate fastens to the bracket.

19. A method of protecting a suspension of a tracked vehicle, the method comprising:
coupling a bracket to a vehicle body of the tracked vehicle;
aligning a deflector plate with the bracket; and
while the deflector plate is aligned with the bracket, fastening the deflector plate to the bracket using hardware, the deflector plate residing at a predefined distance from a wheel of a suspension of the tracked vehicle to deflect debris thrown from the wheel and a track away from a set of suspension components of the suspension;
wherein the deflector plate includes a seam, a first flat section extending away from the seam, and a second flat section extending away from the seam to provide the deflector plate with a V-shaped cross-section; and
wherein the first flat section of the particular deflector plate extends in a downward direction away from the vehicle body to deflect debris encountered from above in a downward direction and away from the suspension.

20. A method as in claim 19, further comprising:
replacing the deflector plate with a replacement plate that is different from the deflector plate.

* * * * *